United States Patent [19]

Iles

[11] Patent Number: 5,460,474
[45] Date of Patent: Oct. 24, 1995

[54] AIRCRAFT LANDING GEAR TROLLEY

[75] Inventor: Leonard E. Iles, Bristol, Great Britain

[73] Assignee: British Aerospace Public Limited Company, Hampshire, Great Britain

[21] Appl. No.: 149,337

[22] Filed: Nov. 9, 1993

[30] Foreign Application Priority Data

Nov. 12, 1992 [GB] United Kingdom ............... 9223716

[51] Int. Cl.$^6$ ...................................................... B66F 5/00
[52] U.S. Cl. ............................................. 414/590; 254/84
[58] Field of Search ................................... 414/589, 590, 414/749; 254/90, 84, 85; 269/73

[56] References Cited

U.S. PATENT DOCUMENTS

| | | | |
|---|---|---|---|
| 2,471,901 | 5/1949 | Ross | 254/9 C |
| 2,931,519 | 4/1960 | Beach | 414/589 |
| 4,288,680 | 9/1981 | Roder | 269/73 X |
| 4,676,492 | 6/1987 | Shamir | 269/73 |
| 4,988,261 | 1/1991 | Blatt | 414/749 |
| 5,061,039 | 10/1991 | Cassidy | 269/73 X |
| 5,120,034 | 6/1992 | Van Engelen et al. | 269/73 |

FOREIGN PATENT DOCUMENTS

| | | |
|---|---|---|
| 0066548 | 12/1982 | European Pat. Off. . |
| 1093216 | 11/1967 | United Kingdom . |
| 1227099 | 3/1971 | United Kingdom . |

*Primary Examiner*—Donald W. Underwood
*Attorney, Agent, or Firm*—Nixon & Vanderhye

[57] ABSTRACT

An aircraft landing gear trolley (1) for supporting a landing gear (2) and adjusting the position of pintle bearings (39, 71) thereof in relation to pintle mountings on an aircraft is provided. The trolley (1) includes a rolling chassis (3) and a number of frames (15, 16, 17, 18, 19) nested therein, each arranged to provide a different degree of freedom for the landing gear (2). The said degrees of freedom include movement along horizontal, longitudinal and transverse axes, raising and lowering movement and rotational movement about horizontal and substantially upright axes. The rotational axes are coincident at a point positioned centrally of one of the pintle bearings (39) of landing gear (2) supported by the trolley.

9 Claims, 7 Drawing Sheets

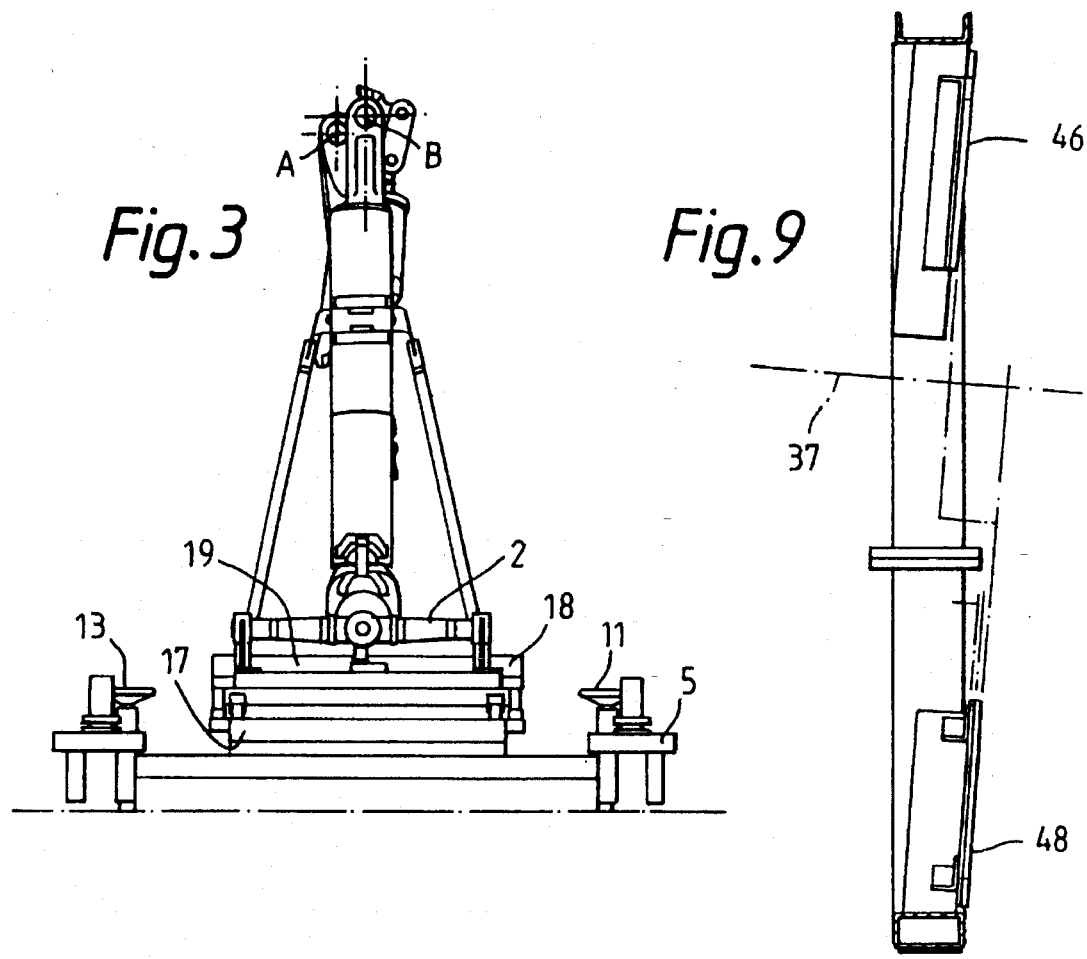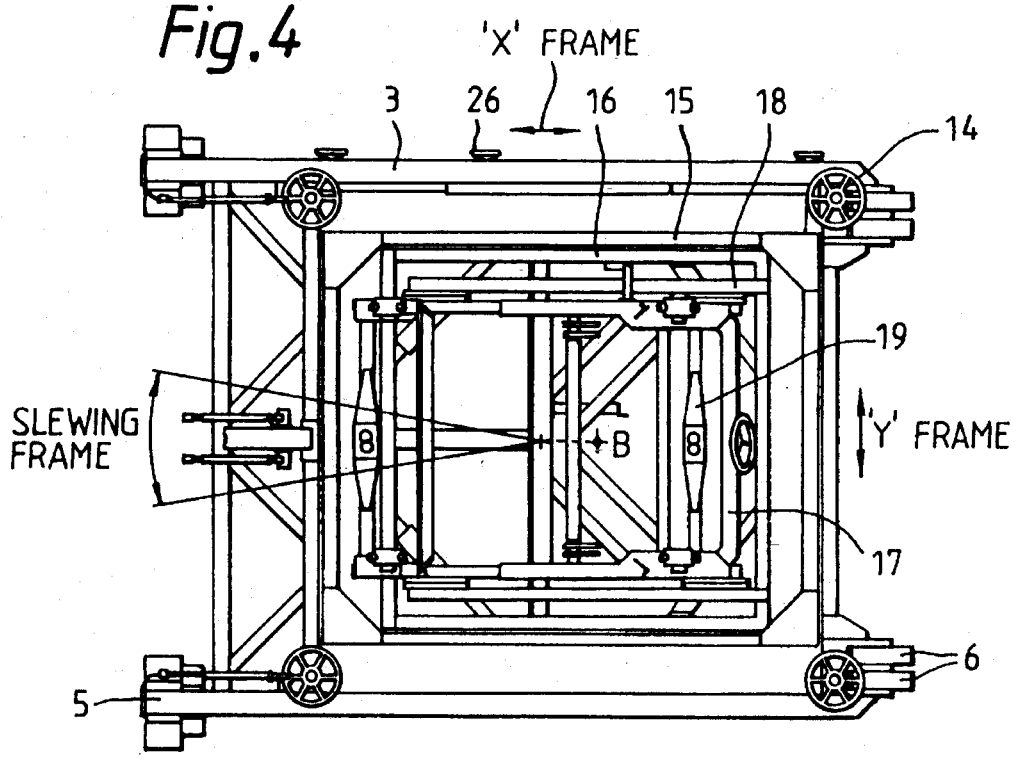

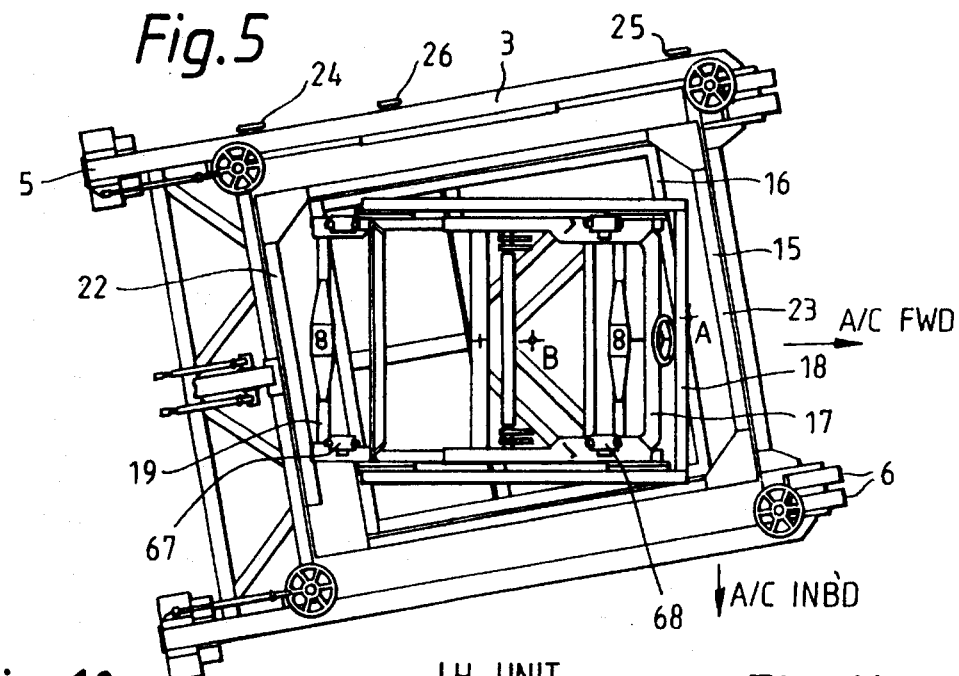
Fig.5
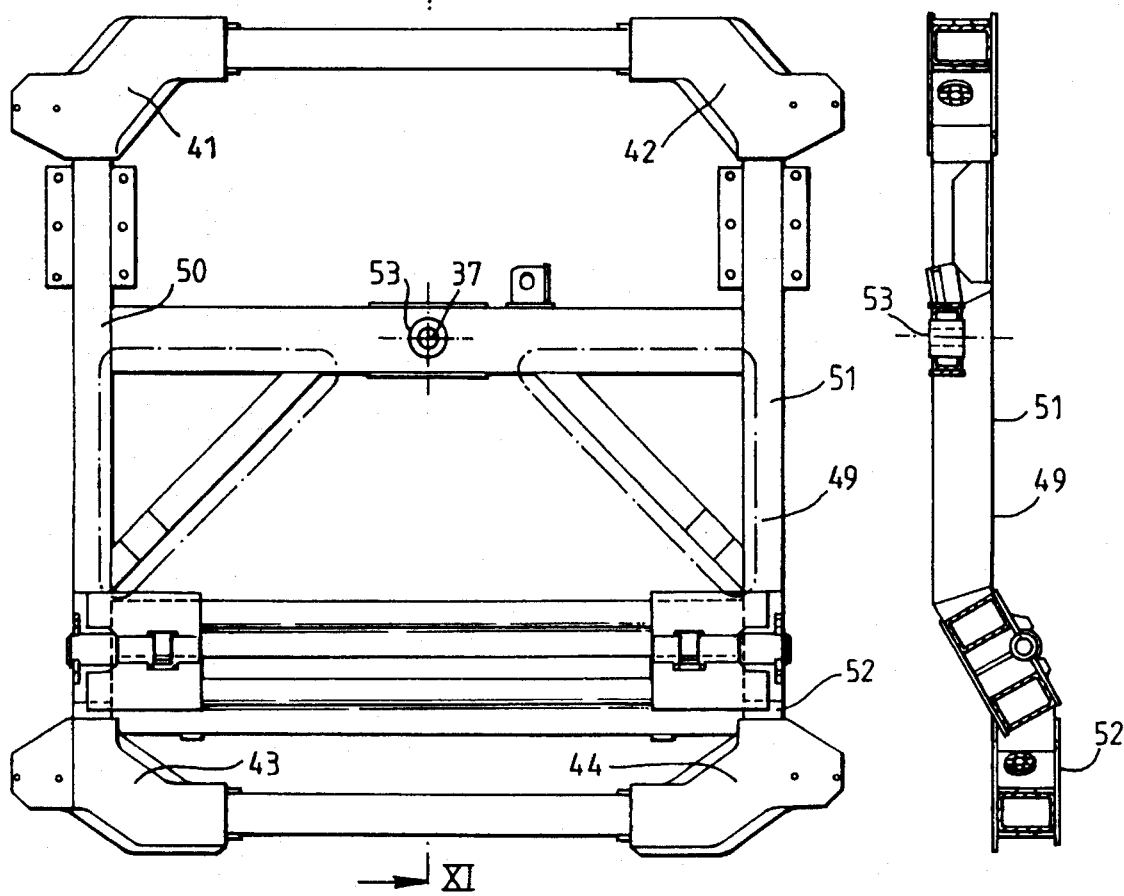
Fig.10
Fig.11

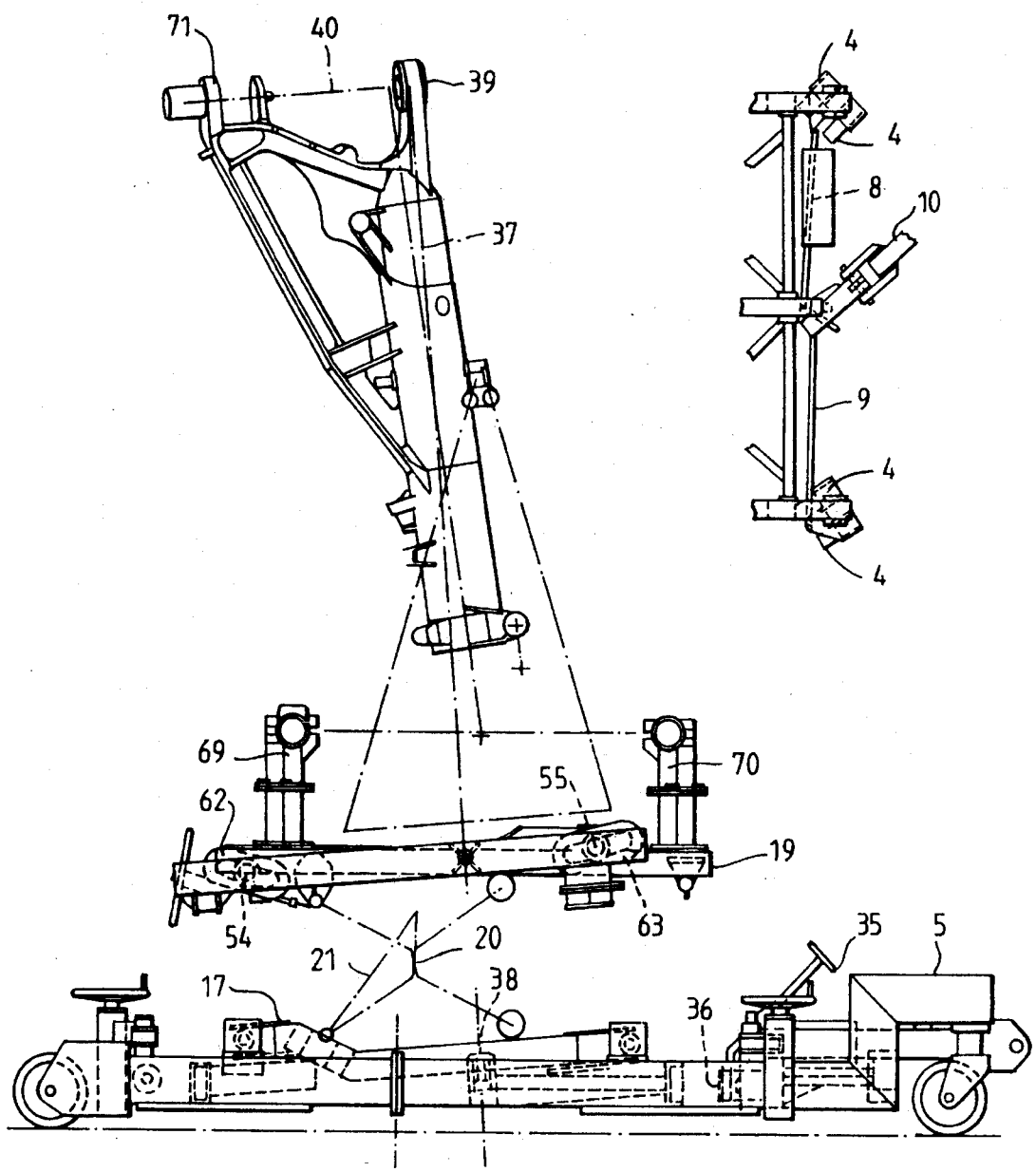

AIRCRAFT LANDING GEAR TROLLEY

BACKGROUND TO THE INVENTION

This invention relates to aircraft landing gear trolleys for use in transporting landing gear to and from aircraft and fitting and removing same to and from the aircraft respectively.

DESCRIPTION OF THE PRIOR ART

A known aircraft landing gear trolley has a rolling chassis with various frames stacked thereon, each providing a separate degree of freedom for a landing gear mounted on the trolley. Known degrees of freedom for the landing gear offered by such a trolley include longitudinal and transverse horizontal movement, vertical raising and lowering movement and rotational movement about horizontal and vertical axes.

SUMMARY OF THE INVENTION

According to the present invention there is provided an aircraft landing gear trolley for supporting a landing gear and adjusting the position of pintle bearings thereof in relation to pintle mountings on an aircraft, the trolley including rolling chassis and a number of frames nested therein each arranged to provide a different degree of freedom for the landing gear, said degrees of freedom including movement along horizontal longitudinal and transverse axes, raising and lowering movement and rotational movement about horizontal and substantially upright axes, wherein said rotational axes are coincident at a point positioned substantially centrally of one of the pintle bearings of landing gear supported by the trolley.

The trolley may include a slewing frame for providing said rotational movement about a substantially upright axis wherein said axis is tilted from the vertical to extend substantially orthogonal to the pintle axis of the aircraft in which the landing gear operates.

The slewing frame may be supported by bearings horizontally spaced from one another and having tracking paths thereof occupying planes spaced from one another in the direction of the slewing axis.

The spacing of the planes is preferably arranged to compensate for the angle of tilt of the slewing axis whereby bearing mountings for the horizontally spaced bearings may be positioned on supporting frame members substantially level with each other.

The overall effect of the foregoing is that the height of the trolley may be kept to a minimum and nesting of frames may be accordingly maximised.

Conveniently, frame members of the slewing frame extending parallel with the plane of tilt of the slewing axis may have portions cranked or bent with respect to one another which extend orthogonal to the slewing axis and enable said tracking paths of the bearings to extend parallel with said portions. Fitting bearings to the frame members at composite angles is thus avoided and manufacture of the cranked frame members is a matter of simple geometry in a single plane.

Pivotal movement about the said horizontal axis may be accomplished by a bearing mechanism in which rollers on one frame engage curved tracks, which may be enclosed in order to keep out dirt, on an adjacent frame. Preferably the bearing mechanism incorporates four such pairs of rollers and curved tracks, two being horizontally spaced from one another on either side of the said adjacent frames. To assist in assembly of the trolley, the rollers and/or the curved tracks may be removable from their respective frames in situ.

The trolley may include axle supports to support a bogie of the landing gear and may in addition comprise a separate support means to provide additional support to the landing gear during transit over longer distances.

The trolley may have sets of wheels at either end thereof, having castors at one end. The castors, or other steering wheels may include an Ackerman-type linkage operated from a central draw bar for the trolley.

A slew bearing acting between the slewing frame and its adjacent frame may comprise a spherical bearing which obviates the need for providing an angled bearing mounting on the said frame adjacent to the slewing frame. In addition, the spherical bearing positioned on one of said slewing and adjacent frames may be slideably engaged by a shaft on the other of said frames to compensate for loading or unloading of the landing gear.

In order to bring the centre of gravity of landing gear carried by the trolley as nearly as possible to the centre of the trolley, and also to centralise the slew axis on the trolley as far as possible. The trolley may be adapted to carry the landing gear such that the slew axis and horizontal pivot axis coincide substantially centrally of a pintle bearing for a main oleo strut of the landing gear.

BRIEF DESCRIPTION OF THE DRAWINGS

The present invention will now be described by way of example with reference to the accompanying drawings of which:

FIG. 3 is a view on arrow III of FIG. 2, FIG. 4 is a plan view of the trolley of FIG. 1 minus landing gear, FIG. 5 shows the trolley of FIG. 4 having a slewing frame in a slewed position to fit a left hand landing gear, FIG. 6 is a partly schematic view of a trolley similar to that of FIG. 1 shown from the other side, FIG. 7 is a plan view of a steering arrangement for a trolley, FIG. 9 is a section IX—IX on FIG. 8, FIG. 10 is a plan view of a slewing frame for the trolley, FIG. 11 is a section XI—XI on FIG. 10.

DESCRIPTION OF PREFERRED EMBODIMENT

Figure 1:
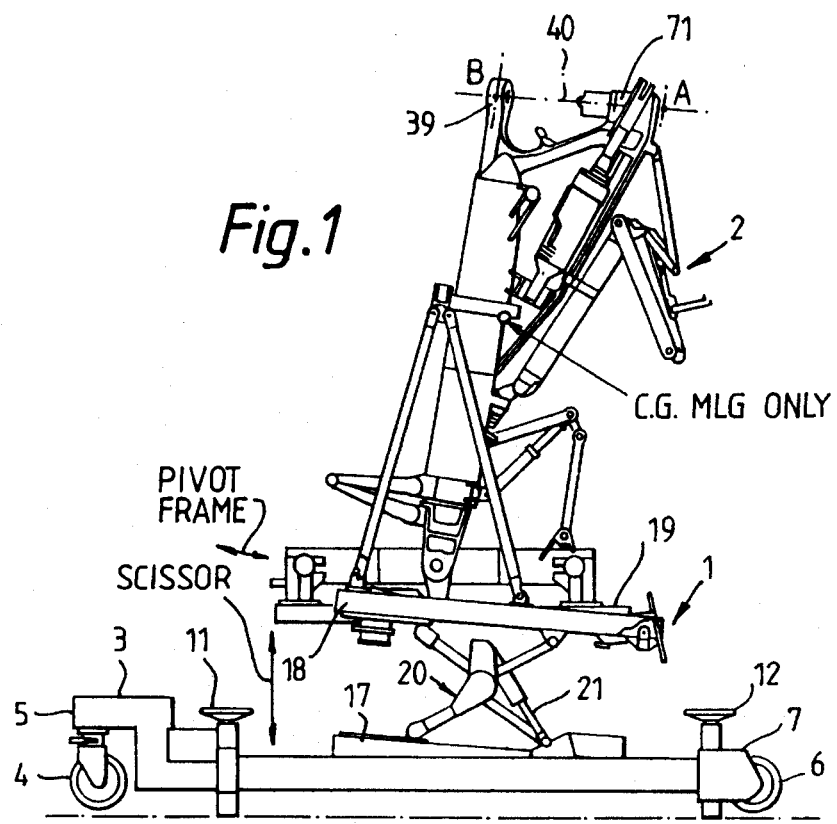
FIG. 1 is a side view of a trolley according to the invention carrying aircraft main landing gear, the trolley being in a raised position.
Figure 2:
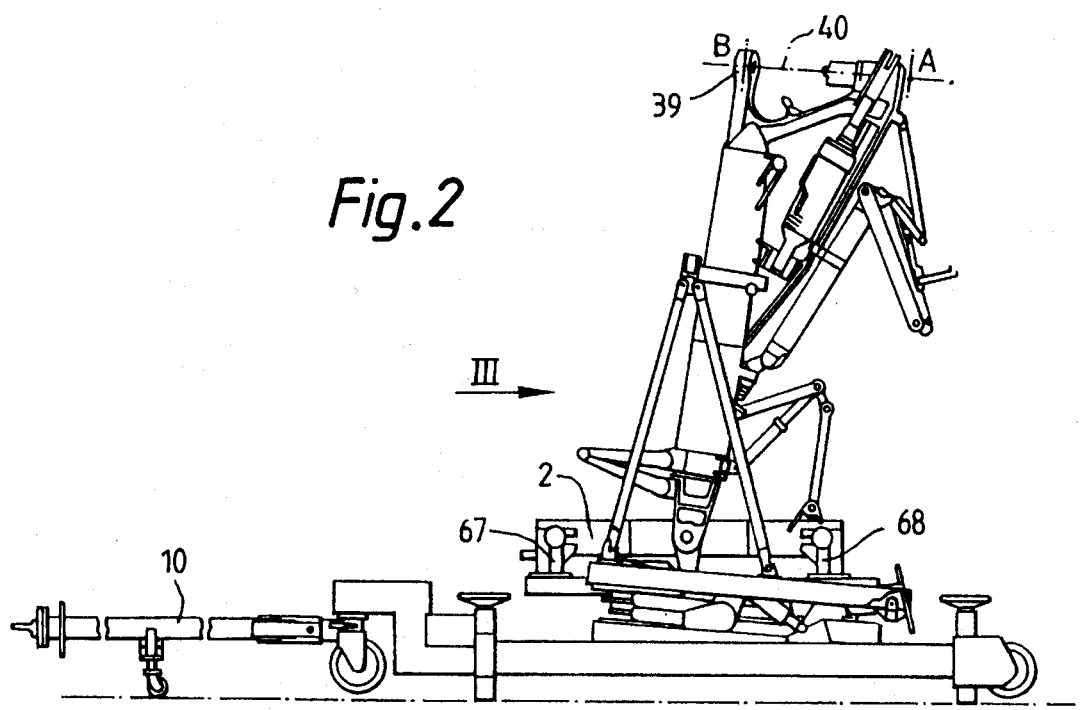
FIG. 2 shows the arrangement of FIG. 1 with the trolley in a lowered position.

Referring to FIGS. 1 to 4, a main landing gear trolley 1 according to the invention is shown carrying a main landing gear 2 of an aircraft in a raised position thereon (along the axis marked "SCISSOR"). FIG. 6 shows the trolley viewed from the opposite side with certain parts shown diagramatically for clarity. The trolley 1 has a rolling chassis 3 supported by castors 4 at a front end 5 thereof and non-steerable wheels 6 at a rear end 7 thereof. To distribute the load more evenly four castors are provided and four non-steerable wheels are provided. The castors 4 and wheels 6 are not provided with tires owing to the high centre of gravity of the loaded trolley: any compliance in the wheels would tend to cause instability during movement of the trolley. Referring to FIG. 7, an Ackerman-type steering linkage is shown in which the castors 4 are turned about castor axes by linkages 8, 9 connected to a pivotable tow bar 10. The different degrees of rotation of the wheels about their castor axes are shown in this figure.

The rolling chassis 3 includes four jacks 11, 12, 13, 14 firmly to support the chassis 3, and also to level same, during assembly and removal of the main landing gear 2.

The trolley includes two groups of nested frames, firstly, a "Y" frame 15 carrying an "X" frame 16 which carries a "slewing" frame 17. Secondly, a "pivot" frame 18 carries a landing gear mounting frame 19 both of which may be raised and lowered with respect to the frames 15, 16, 17 by a scissor jack mechanism 20 acting between the slewing frame 17 and the pivot frame 18. The scissor jack mechanism 20 is operated by a pair of hydraulic struts 21.

Figure 8:
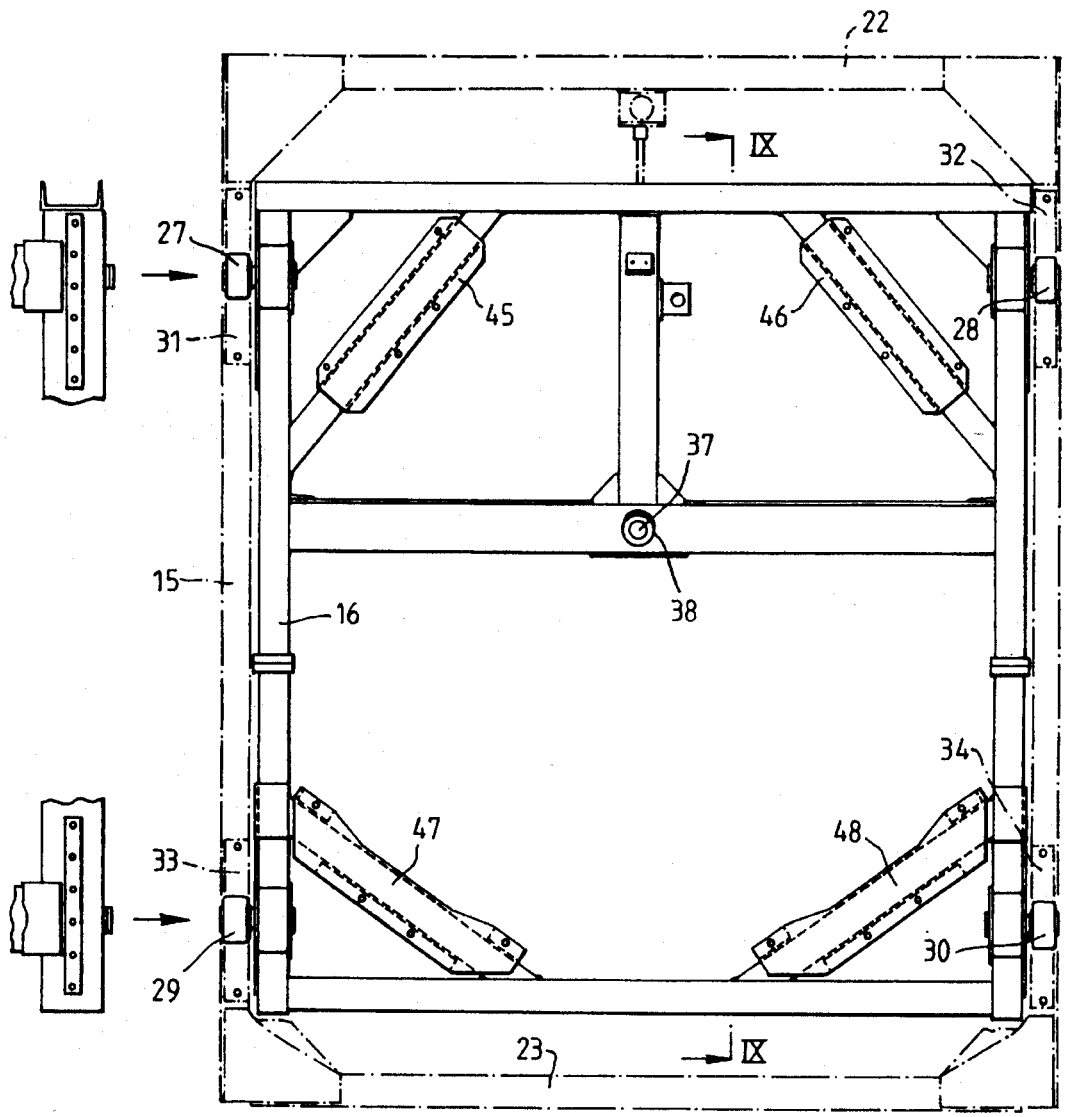
FIG. 8 is a plan view of a frame assembly adapted to give horizontal longitudinal movement of the trolley.
Figure 13:
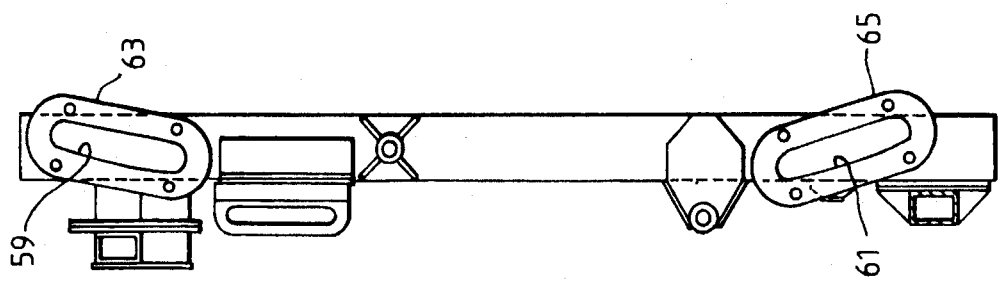
FIG. 13 is a section XIII—XIII on FIG. 12.
Figure 12:
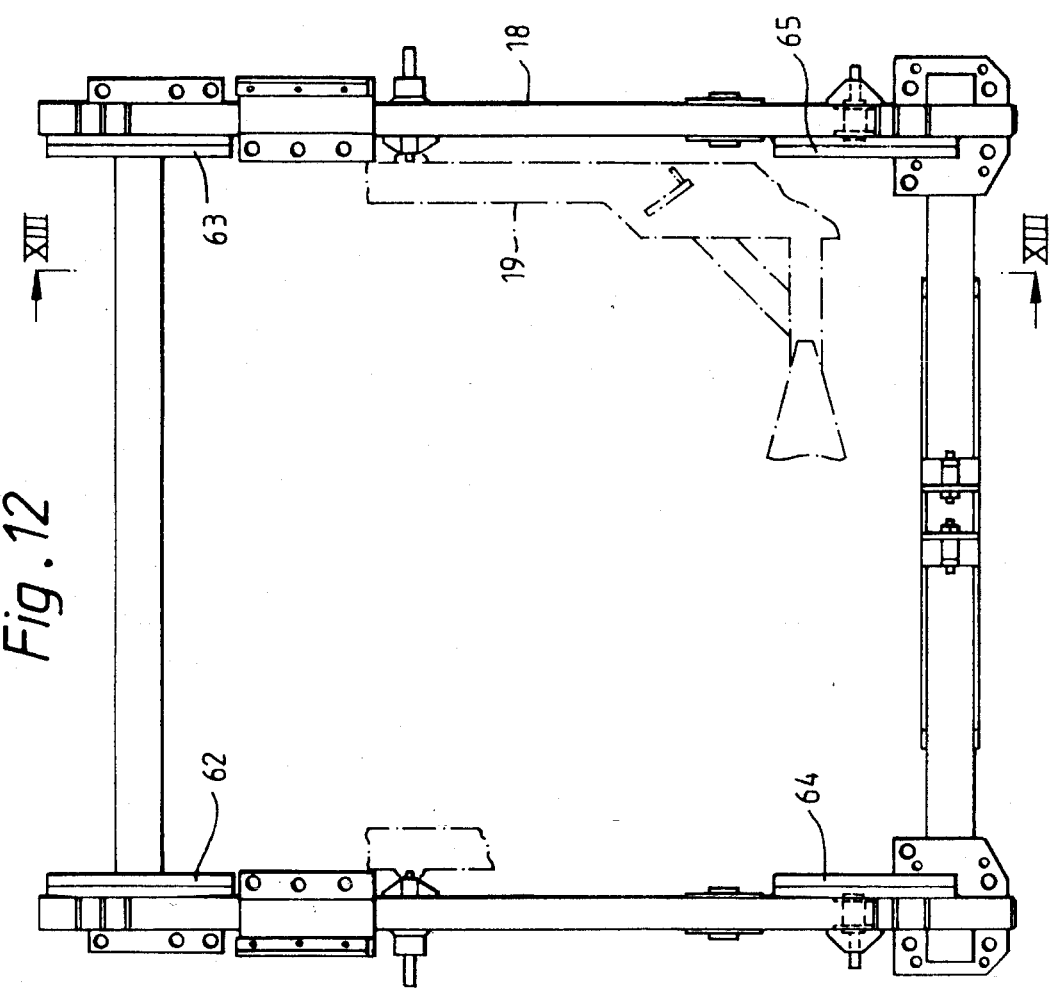
FIG. 12 is a plan view of a frame for providing pivotal movement about a horizontal axis for the landing gear.
Figure 14:
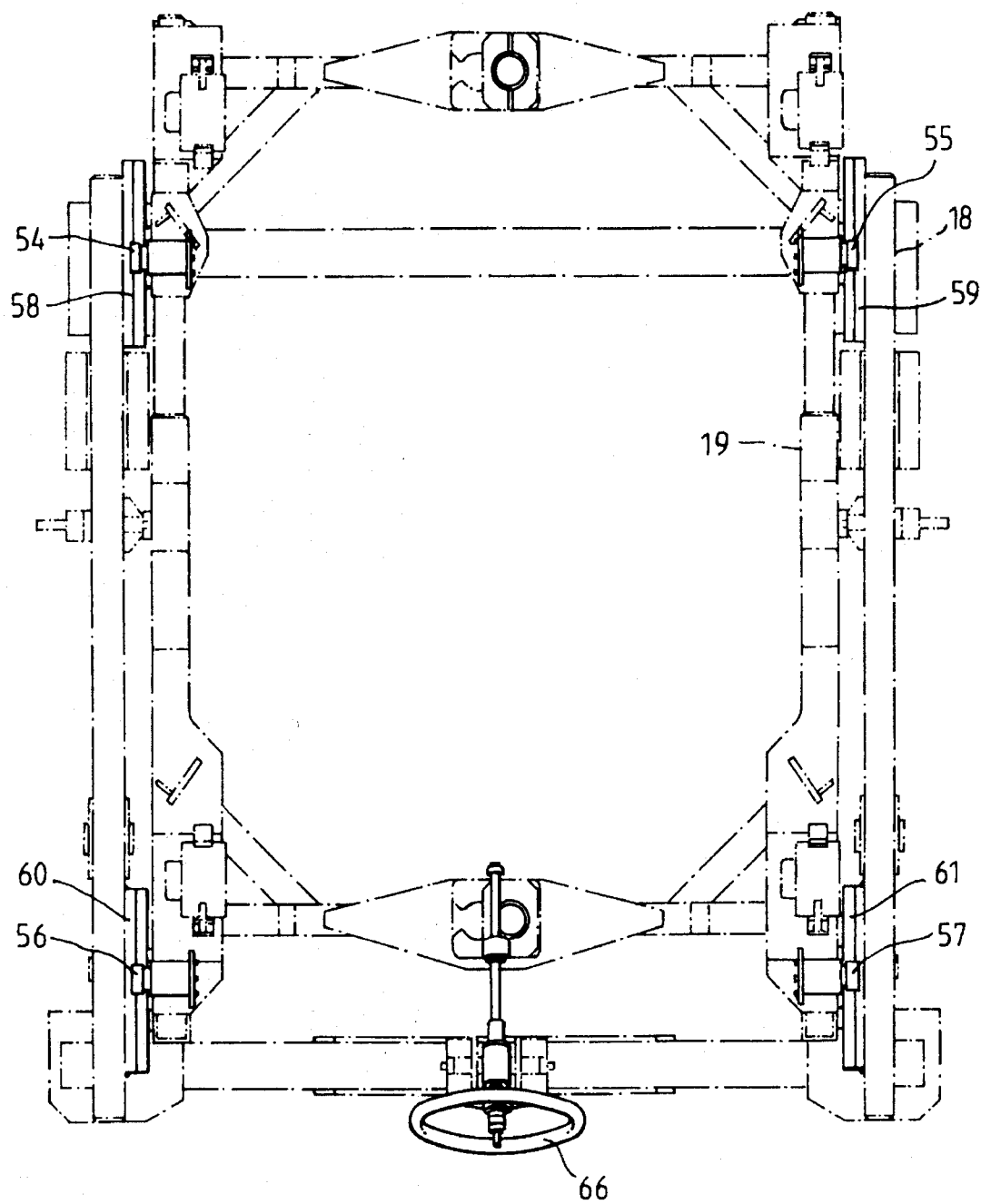
FIG. 14 is a plan view of the pivot frame of FIG. 12 in conjunction with a landing gear mounting frame pivotable thereon.

Referring to FIGS. 4, 5 and 8, the Y frame 15 provides horizontal movement (arrows adjacent "'Y' Frame" in FIG. 4) relative to the chassis 3 transversely of the trolley. Movement is provided by rollers (not shown) rotatably attached to end members 22, 23 of the Y frame bearing upon transversely mounted plates (not shown) on the chassis 3. Actuation of the Y movement is by a pair of linked hand wheels 24, 25 giving coarse adjustment and a third hand wheel 26 giving fine adjustment. Coarse and fine adjustment is provided for this axis of movement owing to the necessity for the trolley 1 to carry differently handed landing gear which requires a considerable range of movement to be covered when initially positioning the gear on the trolley for fitting to an aircraft.

Referring to FIG. 8, the X frame 16 is nested within the Y frame 15 and supported thereby on rollers 27, 28, 29, 30 bearing upon plates 31, 32, 33, 34 attached to the Y frame to provide relative movement between X and Y frames longitudinally of the trolley (arrows adjacent "'X' Frame" in FIG. 4). Actuation is by a hand wheel 35 operating through a bevel gearbox 36 which has clearance to provide adjustment for loading of the trolley.

Referring to FIGS. 1, 2, 4, 5, 6, 8, 10 and 11, the slewing frame 17 is nested within the X frame 16 and mounted for rotational movement with respect thereto. The rotational movement takes place about a slew axis 37 centred on a spherical bearing 38, extending approximately four and a half degrees from the vertical and passing through the centre of a pintle bearing 39 ("B") for the landing gear 2. The slew axis is orthogonal to a pintle axis 40 for the landing gear 2. This slewing arrangement ensures that rotational movement of the slewing frame does not move the pintle bearing 39 which can be sighted in relation to a pintle mounting (not shown) of the aircraft and used as a reference point for further adjustment of the landing gear 2 prior to fitting.

Whereas the spherical bearing 38 guides the slewing rotation of the slewing frame 17, the weight of the slewing frame and equipment carried thereby is borne by four bearings each comprising a roller (not shown) housed within corner housings 41, 42, 43, 44 of the slewing frame 17 for rolling across angled bearing plates 45, 46, 47, 48 (see in particular FIGS. 8, 9 and 10). Referring to FIG. 9, it can be seen that the angled bearing plates 45, 46 lie in planes orthogonal to the slew axis 37, said planes being spaced from one another in the direction of the slewing axis.

The slewing frame 17 has cranked side members 49, 50 (see in particular FIGS. 1, 2, 6, 10 and 11). It can be seen (in FIG. 11) that the angular relationship of cranked or bent portions 51 and 52 with respect to one another enables the fitting of bearing rollers within the corner housing 41, 42 to be straightforward with no compound angles involved. Similarly, a shaft guide 53 in portion 51 is mounted orthogonal to this member. Referring back to FIG. 9, it will be observed that the spacing of the planes of the angled bearing plates 45, 46 in the direction of the slewing axis 37, compensates for the tilt of the slewing axis with respect to the vertical such that the bearing plates 45, 46 are mounted to the X frame 16 substantially level with each other. It will also be observed, that as the cranked portions 51, 52 of the side member 49 are adapted to lie with their neutral axes substantially parallel with angled bearing plates 45, 46, tracking paths of the rollers in the corner housings 41, 42 across the angled bearing plates 45, 46 extend parallel with said cranked portions 51, 52.

Referring in particular to FIGS. 6, 12, 13 and 14, the connection between the landing gear mounting frame 19 and the pivot frame 18 can be seen. The mounting frame 19 is pivotable about a horizontal axis which passes through the centre of the pintle bearing 39. This pivotal movement being controlled by four roller bearings 54, 55, 56, 57 which follow circular paths on enclosed tracks 58, 59, 60, 61 set in slotted housings 62, 63, 64, 65. The roller bearings 54, 55, 56, 57 and housings 62, 63, 64, 65 may be removed in situ to facilitate assembly and disassembly of the trolley.

Pivoting movement of the mounting frame with respect to the pivot frame is achieved by turning hand wheel 66.

Axle clamps 67, 68, 69, 70 for holding the landing gear 2 are positioned so that diagonal interchanging of the clamps will enable oppositely handed landing gear to be accommodated.

OPERATION

1. Use plumb line from aircraft jacking point.
2. From plumbed position mark "box" on ground to receive trolley.
3. Slew slewing frame 17 of trolley appropriately for left or right hand landing gear.
4. Traverse Y frame to fully inboard position in relation to aircraft.
5. Raise landing gear to approximate height of aircraft pintle axis.
6. Slew to correlate pintle axes of aircraft and landing gear.
7. Adjust pivot frame to approximately align pintle axis in vertical plane.
8. Adjust X frame to align pintle axes.
9. Traverse landing gear in Y direction to line up pintle axes.
10. Fine adjust X, Y and lift positions to adjust the central point of pintle bearing 39.
11. Adjust pivot and slew to position pintle bearing 71 ("bearing A") in relation to aircraft.
12. Check bearing alignments with suitable tools.
13. Insert pintle pin in pintle bearing 71.
14. Insert pintle pin in bearing 39.
15. Secure bearings.
16. Remove trolley.

I claim:
1. An aircraft landing gear trolley for supporting and adjusting an aircraft landing gear assembly in a positional relationship with an aircraft to which said landing gear assembly is attachable, said aircraft having at least one pintle mounting and said landing gear assembly including at least one pintle bearing which is alignable with said at least one aircraft pintle mounting by means of said landing gear trolley, said landing gear trolley comprising:

a rolling chassis;

a plurality of frames mounted by and nested within said rolling chassis, at least one frame, of said plurality of frames, for temporarily mounting said landing gear assembly thereon;

means for mounting to said chassis and for interconnecting said plurality of frames with said chassis and for providing translational movement of said at least one frame along non-parallel and substantially horizontal longitudinal and transverse axes relative to said chassis;

means for raising and lowering said at least one frame along a raising and lowering axis relative to said chassis; and means for permitting rotating said at least one frame relative to said chassis about one of said non-parallel and substantially horizontal axes and about a substantially upright axis, wherein said plurality of frames, said interconnecting means, said raising and lowering means and said rotating means together comprise a means for movably connecting said at least one frame to said rolling chassis, where said non-parallel and substantially horizontal axes are located substantially centrally of said at least one pintle bearing on said landing gear assembly and rotation about said one of said non-parallel and substantially horizontal axes produces substantially no translation of said at least one pintle bearing.

2. An aircraft landing gear trolley for supporting and adjusting an aircraft landing gear assembly in a positional relationship with an aircraft to which said landing gear assembly is attachable, said aircraft having at least one pintle mounting and said landing gear assembly including at least one pintle bearing which is alignable with said at least one aircraft pintle mounting by means of said landing gear trolley, said landing gear trolley comprising:

a rolling chassis;

a plurality of frames mounted by and nested within said rolling chassis, at least one frame, of said plurality of frames, for temporarily mounting said landing gear assembly thereon;

means for mounting to said chassis and for interconnecting said plurality of frames with said chassis and for providing translational movement of said at least one frame along non-parallel and substantially horizontal longitudinal and transverse axes relative to said chassis;

means for raising and lowering said at least one frame along a raising and lowering axis relative to said chassis; and means for permitting rotating said at least one frame relative to said chassis about one of said non-parallel and substantially horizontal axes and about a substantially upright axis, wherein said plurality of frames, said interconnecting means, said raising and lowering means and said rotating means together comprise a means for movably connecting said at least one frame to said rolling chassis, wherein said substantially upright axis is a slew axis which is located substantially centrally of said at least one pintle bearing on said landing gear assembly and rotation about said substantially upright axis produces substantially no translation of said at least one pintle bearing.

3. An aircraft landing gear trolley as in claim 2, wherein said at least one pintle bearing comprises at least two pintle bearings disposed along a pintle bearing axis, said means for rotating includes a slewing frame for providing rotational movement about said substantially upright axis wherein said axis is tilted from the vertical at an angle of tilt and in substantially orthogonal to said pintle axis of the aircraft.

4. An aircraft landing gear trolley as in claim 3 in which the slewing frame is supported by bearings horizontally spaced from one another and having angular tracking paths thereof occupying planes spaced from one another along the slewing axis.

5. An aircraft landing gear trolley as in claim 4 in which said plane spacing compensates for the angle of tilt whereby bearing mountings for said horizontally spaced bearings are positioned on supporting frame members substantially level with each other.

6. An aircraft landing gear trolley as in claim 5 in which frame members of the slewing frame, extending parallel with the plane of tilt angle of the slewing axis, have portions cranked with respect to one another which extend orthogonal to the slewing axis and enable said tracking paths of the bearings to extend parallel with said portions.

7. An aircraft landing gear trolley for supporting and adjusting an aircraft landing gear assembly in a positional relationship with an aircraft to which said landing gear assembly is attachable, said aircraft having at least one pintle mounting and said landing gear assembly including at least one pintle bearing which is alignable with said at least one aircraft pintle mounting by means of said landing gear trolley, said landing gear trolley comprising:

a rolling chassis;

a plurality of frames mounted by and nested within said rolling chassis, at least one frame, of said plurality of frames, for temporarily mounting said landing gear assembly thereon;

means for mounting to said chassis and for interconnecting said plurality of frames with said chassis and for providing translational movement of said at least one frame along substantially non-parallel and horizontal longitudinal and transverse axes relative to said chassis;

means for raising and lowering said at least one frame along a raising and lowering axis relative to said chassis; and means for permitting rotating said at least one frame about one of said substantially non-parallel and substantially horizontal axes and about a substantially upright axis, wherein said plurality of frames, said interconnecting means, said raising and lowering means and said rotating means together comprise a means for movably connecting said at least one frame to said rolling chassis, wherein said raising and lowering axis is located substantially centrally of said at least one pintle bearing on said landing gear assembly and translation along said raising and lowering axis produces substantially no rotation of said at least one pintle bearing.

8. An aircraft landing gear trolley for supporting and adjusting an aircraft landing gear assembly in a positional relationship with an aircraft to which said landing gear assembly is attachable, said aircraft having at least one pintle mounting and said landing gear assembly including at least one pintle bearing which is alignable with said at least one aircraft pintle mounting by means of said landing gear trolley, said landing gear trolley comprising:

a rolling chassis;

a plurality of frames mounted by and nested within said rolling chassis, at least one frame, of said plurality of frames, for temporarily mounting said landing gear assembly thereon;

means for mounting to said chassis and for interconnecting said plurality of frames with said chassis and for providing translational movement of said at least one frame along non-parallel and substantially horizontal longitudinal and transverse axes relative to said chassis;

means for raising and lowering said at least one frame along a raising and lowering axis relative to said chassis; and means for permitting rotating said at least one frame relative to said chassis about one of said non-parallel and substantially horizontal axes and about a substantially upright slewing axis, wherein said plurality of frames, said interconnecting means, said raising and lowering means and said rotating means together comprise a means for movably connecting said at least one frame to said rolling chassis, wherein said non-parallel and substantially horizontal axes, said substantially upright slewing axis and said raising and lowering axis are all located substantially centrally of said at least one pintle bearing on said landing gear assembly.

9. An aircraft landing gear trolley as in claim 8, wherein said means for interconnecting and providing translational movement comprises a means for providing translational movement of said at least one frame along orthogonal horizontal axes.

* * * * *